Figure 1A:
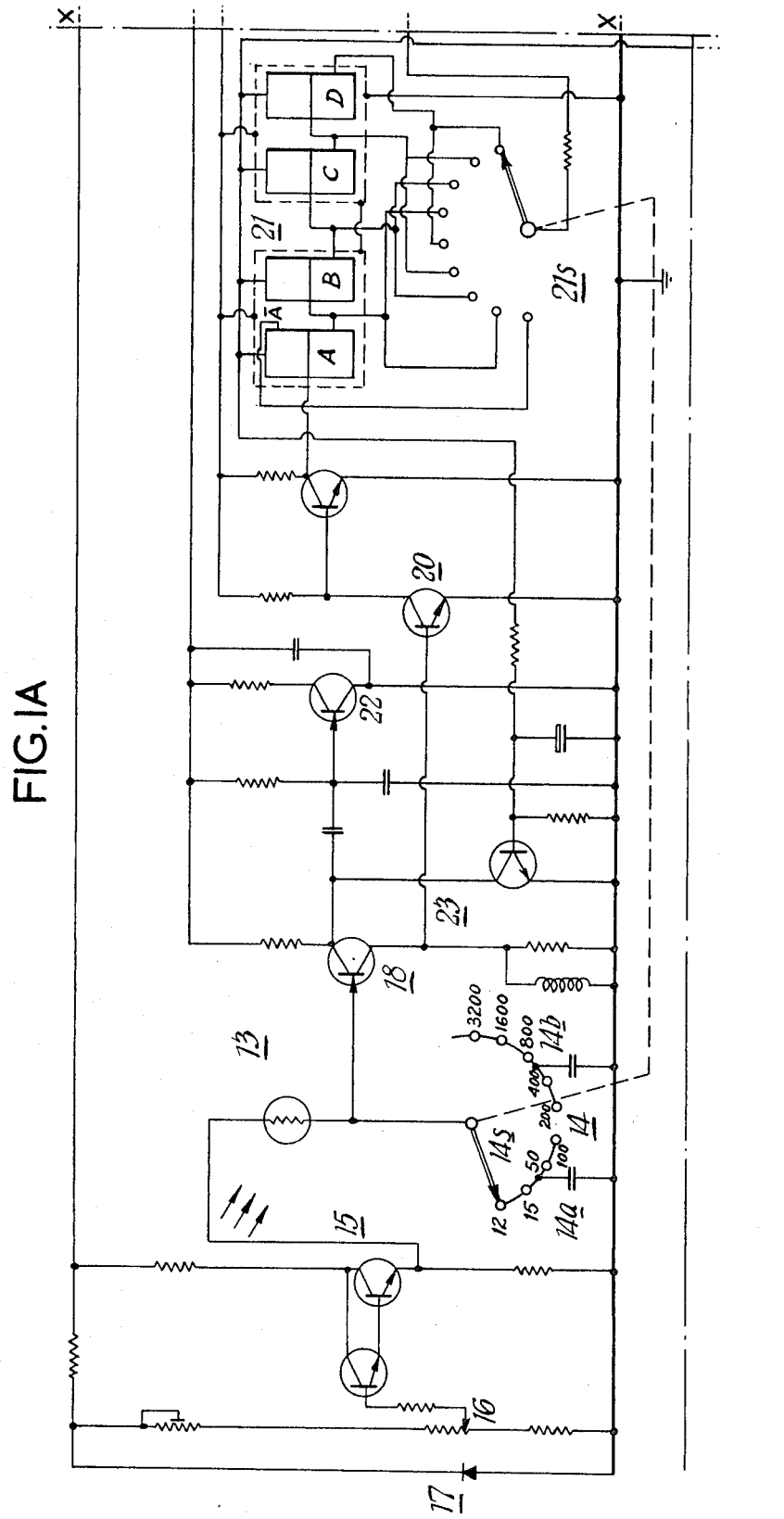

United States Patent [19]
Hinds

[11] 3,727,526
[45] Apr. 17, 1973

[54] PHOTOGRAPHIC EXPOSURE CONTROL ARRANGEMENT

[75] Inventor: David Hinds, Yorkshire, England

[73] Assignee: Vickers Limited, London, England

[22] Filed: Feb. 11, 1970

[21] Appl. No.: 10,394

[30] Foreign Application Priority Data

Feb. 11, 1969 Great Britain..................7,440/69

[52] U.S. Cl...........95/10 CT, 95/53 EB, 250/214, 307/117, 307/293, 317/124, 317/148.5
[51] Int. Cl..............................................G03b 7/08
[58] Field of Search................95/10 C, 53 R, 53 E, 95/10 CT, 53 EA, 53 EB; 250/206, 214, 215; 307/117, 129, 293, 294; 317/124, 147, 148.5

[56] References Cited

UNITED STATES PATENTS

| | | | |
|---|---|---|---|
| 3,502,010 | 3/1970 | Kennel | 95/10 CT |
| 3,348,462 | 10/1967 | Fahlenberg | 95/53 E |
| 3,425,328 | 2/1969 | Ichivo | 95/10 C |
| 3,418,479 | 12/1968 | Schmitt | 95/10 C |
| 3,442,190 | 5/1969 | Erickson | 95/10 C |
| 3,503,313 | 3/1970 | Kuramoto | 95/10 C |

FOREIGN PATENTS OR APPLICATIONS 1,284,280  11/1968  Germany..................95/10 CT

*Primary Examiner*—Joseph F. Peters, Jr.
*Attorney*—Waters, Roditi, Schwartz & Nissen

[57] ABSTRACT

A photographic exposure control arrangement in which pulses are produced by the repeated charge and discharge of a capacitor in dependence upon the light intensity and an electromagnetic shutter is held open for the duration of a predetermined number of pulses which are counted by a binary counter.

13 Claims, 3 Drawing Figures

PHOTOGRAPHIC EXPOSURE CONTROL ARRANGEMENT

This invention relates to photographic exposure control arrangements.

Existing arrangements for automatic control of exposure time, as commonly used in photomicrography, employ either photoemissive cells (e.g. photomultipliers) or photoconductive cells (e.g. cadmium sulphide cells) to detect the intensity of the image-forming light. The current derived from the photodetector is directly proportional to the intensity of the light. This current is used to charge a capacitor. The charging of the capacitor is initiated when the exposure is started, and the exposure is automatically terminated when the capacitor has been charged up to a predetermined voltage. The duration of the exposure is therefore proportional to the value of the capacitor and indirectly proportional to the light intensity.

The known arrangements have the following disadvantages:

1. Large values of capacitance (of the order of several micro-farads) are required in order to obtain the long exposure times required for slow speed photographic materials under conditions of low light level.
2. Several matched values of capacitance are normally required in order to permit the use of a wide range of film speeds.
3. The leakage resistance of the timing capacitor and the input resistance of the voltage detector limit the longest time exposure which can be achieved.
4. It is difficult to provide a warning system to indicate when the light intensity is excessive for a given film setting (i.e. when a brief exposure beyond the capabilities of the camera shutter would be necessary).
5. It is difficult to indicate the exposure time on a meter in advance of making the exposure.

The present invention aims to improve upon the known arrangements.

According to the present invention there is provided an automatic photographic exposure arrangement including an electromagnetic shutter and a control circuit for the shutter, incorporating means for initiating an exposure, a photodetector responsive to incident light from the object, capacitance means arranged to be charged in response to incident light on the detector, a voltage level detector arranged to discharge the capacitance means upon the voltage thereacross reaching a predetermined level thereby to produce pulses at a rate proportional to the light intensity, a pulse counter for counting the pulses from the voltage level detector, the counter being arranged to provide an output signal upon a predetermined number of input pulses to the counter being reached, and means responsive to an output from the counter for terminating the exposure.

Figure 1B:
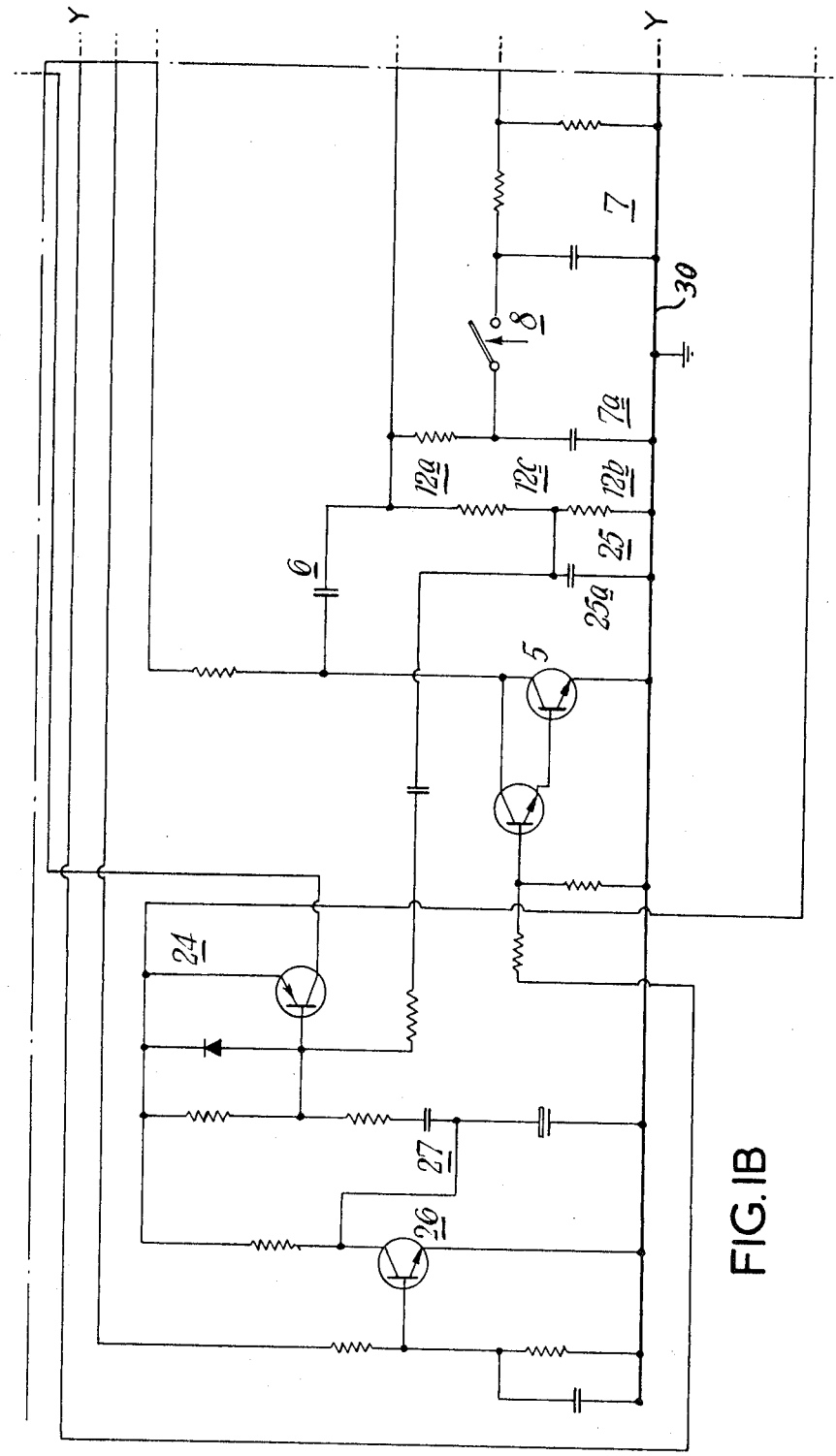
Figure 1C:
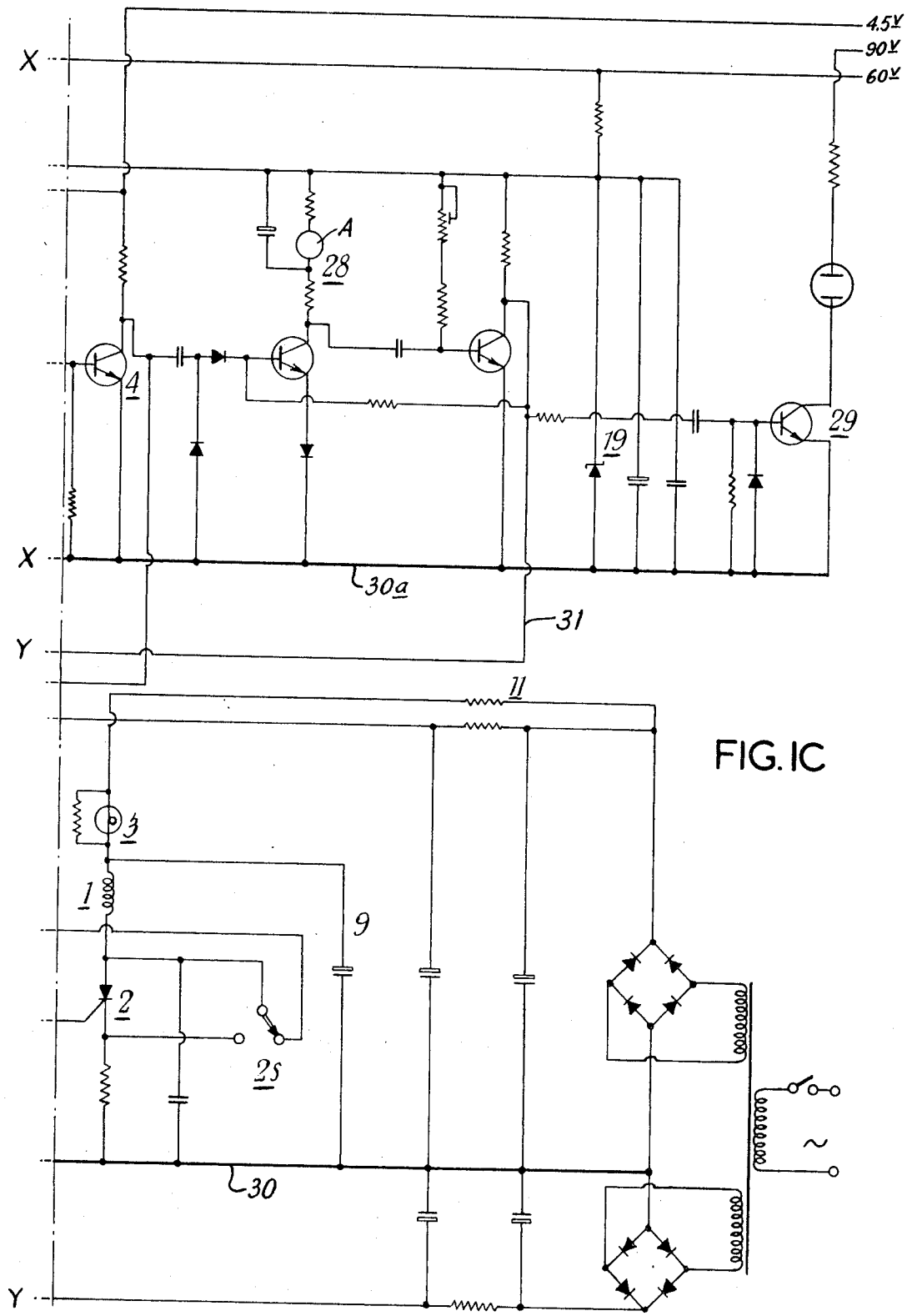

An automatic photographic exposure arrangement in accordance with the invention will now be described, by way of example, with reference to the accompanying drawing in which FIGS. 1A, 1B and 1C cooperatively constitute a schematic diagram of a circuit of the invention, FIGS. 1A and 1B being respectively connected to the upper and lower lefthand sides of FIG. 1C.

Referring to the drawing, the exposure arrangement includes an electromagnetic shutter and a control circuit for the shutter. The shutter comprises a shutter coil 1 which is connected, in series with a control Thyristor 2 and an indicator lamp 3 forming part of the control circuit, across a 90 v supply. For the purposes of controlling the Thyristor 2, the control circuit includes a transistor 4 connected across a 4.5 v supply, a monostable circuit 28, which has a second function to be described later, and a transistor 5 which is connected across a 60 v supply. A capacitor 6 connects the collector of the transistor 5 through a switch 2s to the Thyristor anode to switch off the Thyristor at the end of an exposure as explained below.

The control circuit comprises a portion 7 which includes a capacitor 7a which is charged from the 60 v supply. One terminal of the capacitor 7a is connected through an exposure initiating switch 8 to the gate of the Thyristor 2. Normally the transistor 5 is switched off with the result that the capacitor 6 is charged. Closure of the switch 8 discharges the capacitor 7a resulting in a positive voltage being applied briefly to the gate of the Thyristor 2 thereby triggering the Thyristor which in turn causes current to flow through the shutter coil 1 to operate the shutter. At the same time the indicator lamp 3 is lit. Rapid operation of the shutter is insured by a capacitor 9 which, before the switch 8 is operated, charges to 90 v, and which, when the switch is closed, discharges through the shutter coil 1 giving a momentarily large current. A series resistor 11 provides a reasonable holding current for the duration of the exposure. The exposure is terminated by a pulse being applied, by means which will be described later, to the base of the transistor 5 which switches the transistor on, switching on the transistor 5 results in the discharge of the capacitor 6 with the result that a large negative pulse is applied to the anode of the Thyristor 2 to switch it off. It will be noted that two resistors 12a and 12b, having a common point 12c are connected between the capacitor 6 and the zero voltage rail (30 in FIGS. 1B and 1C). When the switch is closed, a negative pulse appears at the common point 12c for a purpose which will become apparent later. The switch 2s is a two position switch. The position shown is for automatic operation of the shutter. In the other position the Thyristor 2 is short-circuited to provide manual operation of the shutter.

The control circuit also includes a photodetector 13, which conveniently is in the form of a cadmium sulphide photoemissive cell (it may, on the other hand, be photoconductive), and a capacitive circuit 14 connected, in series with one another through a nine pole switch 14s, to a further zero voltage rail (30a in FIGS. 1A and 1C) on the one hand and to the output of an emitter follower 15 on the other hand. The input to the emitter follower 15 is from the tapping of a potential divider 16 providing a range of applied voltage across the photodetector from 0–9 v originating from a 28 v stabilized voltage supply provided by a portion 17 of the control circuit. There is associated with the photodetector 13 and the capacitive circuit 14, a voltage level detector in the form of a unijunction transistor 18 connected to a 9 v stabilized supply which is provided by a zener diode 19 and a series resistor connected to the 60 v supply. The controlled path of the transistor 18 is connected to a 4 stage binary counter 21 via a buffer circuit 20. The capacitive circuit 14 comprises two capacitors 14a and 14b of differing values. Four poles of the switch 14s are connected to one terminal of the capacitor 14a, and the other five poles of the switch 14s are connected to one terminal of the capacitor 14b. The other terminals of the capacitor 14a and 14b are connected to the zero voltage line. The purpose of having two capacitors will be explained later.

The function of the photodetector 13 is to enable one of the capacitors of the capacitive circuit 14 to become charged in response to incident light on the detector and the function of the unijunction transistor 18 is to discharge the capacitor upon the voltage thereacross reaching a predetermined level thereby producing an output pulse. Which capacitor is charged depends, of course, upon the position of the switch 14s. The process is repetitive in that the capacitor will successively charge and discharge resulting in pulses being fed to the counter 21 at a pulse rate proportional to the light intensity. In order to allow the use of a cell of relatively high resistance (up to 200 megohms), the circuit includes a second unijunction transistor 22 which forms part of a relaxation oscillator to trigger the transistor 18. For the purposes of discharging the capacitor at the beginning of an exposure, a further transistor 23 is connected across the unijunction transistor 18. The base of the transistor 23 is connected to the reset terminal of the counter 21.

The 4 stage binary counter 21 has, in addition to an input terminal, a reset terminal connected to the collector of a fourth transistor 24. To the emitter of this transistor 24 is connected a 4.5 v supply lead and to the base the aforesaid common point 12c through a time delay circuit 25 which comprises a capacitor 25a and the resistor 12b. The counter is provided in known manner with a nine pole stage selector switch 21s the output of which is connected to the base of the transistor 4. The counter 21 is provided with five outputs A to D and an $\bar{A}$ or a not output. Each of the outputs A to D is connected to two poles of the switch 21s and the ninth pole is connected to the $\bar{A}$ output. The numbers adjacent the nine poles represent ASA film speed ratings and it will be seen that these decrease in powers of two from the A output to the D output to correspond to the base 2 of the binary counter. The switch 21s is ganged with the switch 14s and it will be seen that the poles of the switch 14s connected to capacitor 14a, which has a higher capacitance value than 14b, correspond to the poles of the switch 21s representing the ASA ratings 12 to 100 and that the terminals of the switch 14s connected to capacitor 14b correspond to the terminals of the switch 21s representing the ASA rating 200 to 3200. If we consider two poles of the switch 21s representing the ASA ratings 12 and 200 which are both connected to the stage D output of the binary counter, it will be seen that the two corresponding poles of the switch 14s are connected to the respective capacitors 14a and 14b. The capacitor 14a, being of higher capacitance than the capacitor 14b will take longer to charge and will therefore result in a pulse rate of lower frequency than that obtained from the capacitor 14b for the same light intensity. In this way, therefore each stage of the binary counter can be used for two different ASA ratings. Of course, the two capacitors 14a and 14b can be replaced by a single capacitor, but it would then be necessary to cover the same number of film speed ratings to have an eight-stage binary counter. The output from the switch 21s is connected to the base of the transistor 4 and a feedback path from this transistor 4 is taken through a buffer stage 26 and a capacitor 27 to transistor 24 and thence to the reset terminal of the counter 21 thereby to reset the counter to zero after a short time delay when the predetermined count is reached.

Also the output from the counter 21, in the form of pulses, is fed to the monostable multivibrator 28 through the transistor 4.

In operation of the control circuit, closure of the switch 8 at the beginning of an exposure causes the Thyristor 2 to be triggered and the shutter to be operated as described above. The resulting negative pulse from the output 12c switches the transistor 24 on momentarily which has two results. Firstly the counter 21 is reset to zero and secondly the transistor 23 is switched on momentarily thus shorting out the output of the unijunction transistor 18. This insures that the capacitor 14 of the capacitance means to be used is initially discharged. It should be mentioned here that this step takes approximately 5 milliseconds (to suit the mechanical characteristics of the shutter).

The light incident upon the detector 13 results in pulses being fed to the counter 21 and, depending upon the position of the switch 21s (which is set in accordance with the particular ASA rating), when a predetermined number of pulses have been fed into the counter 21 the latter provides an output. This switches off the transistor 4 and results in the monostable circuit 28 being switched temporarily out of its quiescent state. As a result a pulse is sent via the line 31 to the base of the transistor 5 to switch this transistor on, discharge the capacitor 6 and hence close the shutter as described above. It should be mentioned here that normally the switch 8 will still be depressed but this does not result in a further exposure since only when the switch 8 is released is the capacitor 7a recharged which takes approximately three seconds.

The selector switch of the counter will be adjusted in accordance with the desired duration of exposure determined by the film speed. If an adjustment of the density of the image is desired, then the potential divider 16 provides this by adjusting the stabilized voltage across the detector 13 and the capacitor 14.

The monostable multivibrator 28 is used to produce a meter indication on the meter A of the exposure time to be expected so that the light level may be adjusted to give a suitable shutter speed and to ensure that exposure times beyond the capability of the shutter (i.e. faster than one one-hundredth second) are not attempted.

The meter reading is proportional to the frequency of the input trigger pulses which are derived from the counter output, and is thus inversely proportional to the exposure time. A large capacitor is connected across the meter to damp the meter movement sufficiently to allow exposure times as long as one-fifth of a second to be shown as a steady reading.

To indicate long exposure times the neon flasher circuit 29 is incorporated. This simply gives a flash at intervals equal to the exposure times, so that the latter may be determined by using a stop watch. It will be seen to consist of a high voltage switching transistor switched on by the monostable output pulse.

What is claimed is:

1. An automatic photographic exposure arrangement comprising an electromagnetic shutter including an operating coil and an electric supply and control circuit for the shutter, said circuit comprising a Thyristor having a gate and connected in series with said coil, a first capacitor discharge device including a first capacitor and an exposure initiating switch for connecting the capacitor to the Thyristor gate to initiate an exposure, a photo-detector responsive to incident light from an object, capacitance means arranged to be charged in response to incident light on the photodetector, a voltage level detector to discharge the capacitance means upon the voltage thereacross reaching a predetermined level thereby to produce pulses at a rate proportional to the light intensity, a pulse counter for counting the pulses from the voltage level detector, the counter providing an output signal upon a predetermined number of input pulses to the counter being reached and a second capacitor discharge device incorporating a second capacitor and a first transistor which is connected between the second capacitor and the Thyristor and which is responsive to said output signal to terminate the exposure, and a second transistor connected across the output of the voltage level detector and means responsive to operation of the exposure initiating switch for momentarily switching on the second transistor to initially discharge the capacitance means.

2. An arrangement as claimed in claim 1 wherein the pulse counter includes a reset terminal and the base of the second transistor is connected to the reset terminal.

3. An arrangement as claimed in claim 5, comprising a multi-pole switch including poles and wherein the counter is a multi-stage binary counter including stage outputs respectively connected to the poles of said multi-pole switch.

4. An arrangement as claimed in claim 3, wherein the binary counter is an eight-stage counter including a NOT output at the first stage and the switch is a nine-pole switch, the eight stage outputs of the counter being respectively connected to selected poles of the switch and another pole of the switch being connected to the NOT output of the first stage of the counter.

6. An arrangement as claimed in claim 2, wherein the binary counter is a four-stage counter including a NOT output at the first stage and the switch includes nine poles, the four stage outputs of the counter being respectively connected to four pairs of poles of the switch and the ninth pole of the switch being connected to the NOT output of the first stage of the counter.

7. An arrangement as claimed in claim 6, comprising a further nine-pole switch and wherein the capacitance means comprises two capacitors of differing values which are adapted to be connected to the photodetector through said further nine-pole switch which is ganged with the first-mentioned nine-pole switch, four of the poles of the further switch being connected to one capacitor and the remaining five poles of the switch being connected to the other capacitor.

8. An arrangement as claimed in claim 7, comprising third and fourth transistors and wherein the output from the multi-pole switch is connected to the base of the third transistor and the output of the third transistor is connected to the base of the fourth transistor whose output is connected to the reset terminal of the counter.

9. An arrangement as claimed in claim 8, comprising a monostable multivibrator and wherein the output of the third transistor is also connected to the input of the monostable multivibrator and the output of the monostable multivibrator is connected to the base of the said first transistor.

10. An arrangement as claimed in claim 9, comprising a neon flasher circuit and wherein the monostable multivibrator output is also connected to said neon flasher circuit.

11. An arrangement as claimed in claim 10, wherein the photodetector is a photoemissive cell.

12. An arrangement as claimed in claim 10, wherein the photodetector is a photoconductive cell.

13. An arrangement as claimed in claim 12, wherein the photoconductive cell is a sulphide cell.

* * * * *